(12) United States Patent
Westman et al.

(10) Patent No.: US 9,210,224 B2
(45) Date of Patent: *Dec. 8, 2015

(54) SERVICE PROVISIONING IN A COMMUNICATION SYSTEM

(75) Inventors: Ilkka Westman, Helsinki (FI); Gabor Bajko, Budapest (HK); Seppo Huotari, Espoo (FI); Kirsztian Kiss, San Diego, CA (US); Olli M. Pulkkinen, Espoo (FI); Kalle Tammi, Tampere (FI); Markku Tuohino, Espoo (FI)

(73) Assignee: Nokia Technologies Oy, Espoo (FI)

( * ) Notice: Subject to any disclaimer, the term of this patent is extended or adjusted under 35 U.S.C. 154(b) by 459 days.

This patent is subject to a terminal disclaimer.

(21) Appl. No.: 12/320,654

(22) Filed: Jan. 30, 2009

(65) Prior Publication Data
US 2009/0144397 A1 Jun. 4, 2009

Related U.S. Application Data

(63) Continuation of application No. 10/615,420, filed on Jul. 9, 2003, now Pat. No. 7,502,837.

(30) Foreign Application Priority Data

Mar. 25, 2003 (GB) .................................. 0306863.2

(51) Int. Cl.
*G06F 15/16* (2006.01)
*H04L 29/08* (2006.01)
*H04L 29/06* (2006.01)

(52) U.S. Cl.
CPC ............... *H04L 67/16* (2013.01); *H04L 29/06* (2013.01); *H04L 65/4007* (2013.01); *H04L 67/14* (2013.01); *H04L 67/28* (2013.01); *H04L 69/329* (2013.01); *H04L 65/1016* (2013.01)

(58) Field of Classification Search
CPC . H04L 65/1016; H04L 65/1046; H04L 67/28; H04L 69/329
USPC .......................................................... 709/219
See application file for complete search history.

(56) References Cited

U.S. PATENT DOCUMENTS 5,109,220 A 4/1992 Breeden et al.
5,649,099 A * 7/1997 Theimer et al. .................... 726/4
(Continued)

FOREIGN PATENT DOCUMENTS

RU 2076459 3/1997
RU 2000113222 4/2002
(Continued)

OTHER PUBLICATIONS

RFC 3261. SIP: Session Initiation Procotol. http://www.ietf.org/rfc/rfc3261.txt. Jun. 2002. pp. 1-269.*
(Continued)

*Primary Examiner* — John MacIlwinen
(74) *Attorney, Agent, or Firm* — Mintz Levin Cohn Ferris Glovsky and Popeo, P.C.

(57) ABSTRACT

The invention relates to a service provisioning method in a communication system. In the method information regarding a communication control entity capable of servicing a user of the communication system is received at a first entity associated with the communication system from a storage entity. Based on said information, an originating request is then signalled from the first entity to the communication control entity.

15 Claims, 4 Drawing Sheets

(56) References Cited

U.S. PATENT DOCUMENTS

| | | |
|---|---|---|
| 7,043,241 B1 | 5/2006 | Sladek et al. |
| 2001/0018711 A1 | 8/2001 | Morris |
| 2001/0049790 A1 | 12/2001 | Faccin et al. |
| 2002/0027915 A1 | 3/2002 | Foti et al. |
| 2003/0053441 A1 | 3/2003 | Banerjee |
| 2004/0148425 A1 | 7/2004 | Haumont et al. |

FOREIGN PATENT DOCUMENTS

| | | |
|---|---|---|
| WO | 99/52306 | 10/1999 |
| WO | 02/09365 | 1/2002 |
| WO | WO 02/09365 | 1/2002 |
| WO | WO-02/09365 A1 | 1/2002 |
| WO | WO 02/09365 A1 | 1/2002 |

OTHER PUBLICATIONS

English translation of the Notification of the Fourth Office Action dated Feb. 5, 2010, issued by the State Intellectual Property of China in connection with corresponding Chinese application No. 2004800121354, p. 1-4.

"Digital Cellular Telecommunications System (Phase 2+), Universal Mobile Telecommunications System (UMTS), IP Multimedia Call Control Protocol Based on SIP and SDP, Stage 3 (3GPP TS 24.2290 version 5.3.0, release 5, ETSI TS 124 229," ETSI Standards, European Telecommunicaion Standard Institute, vol. 3-CN1, No. V530, Dec. 2002, p. 1-232.

"Digital Cellular Telecommunications System (Phase 2+), Universal Mobile Telecommunication System (UMTS), IP Multimedia (IM) Session Handling, IM Call Model, Stage 2 (3GPP TS 23.218, version 5.3.0, release 5), ETSI TS 123 218," ETSI Standards, European Telecommunicaiton Standard Institute, vol. 3-CN1, No. V530, Dec. 2002, p. 1-58.

"Security Relationships of Interrogating CSCF (I-CSCF)," 3GPP TSG SA2, Tdoc S3z010034, Apr. 26, 2001, p. 1-7.

A. Gulbrandsen, RFC 2782, "A DNS RR for Specifying the Location of Services (DNS SRV)," Feb. 2000, <ietf.org/rfc/rfc2782.txt>, p. 1-11.

M. Wasserman, Recommendation for IPv6 in 3GPP Standards, Jan. 2002, <tools.ietf.org/id/draft-ietf-ipv6-3gpp-recommend-00.txt>, p. 1-19.

English translation of the Notice of Final Rejection dated Dec. 24, 2009, issued by the Korean Intellectual Property Office in connection with counterpart Korean application No. 2007-7028752, p. 1-5.

English Translation of the Notification of the third Office Action dated Oct. 23, 2009, issued by the Patent Office of the People's Republic of China, issue in connection with counterpart Chinese application No. 2004800121354, p. 1-7.

Lucent, Nokia, "Tdoc NP-040108 Change Request 24.229 CR 605," 3GPP TSG-CN Meeting 23, "Online," Mar. 10, 2004, pp. 1-6, XP002288010.

"Digital Cellular Telecommunications System (Phase 2+), Universal Mobile Telecommunciations System (UMTS), IP Multimedia Call Control Protocol Based on SIP and SDP, Stage 3 (3GPP TS 24.2290 version 5.3.0, release 5, ETSI TS 124 229," ETSI Standards, European Telecommunication Standards Institute, vol. 3-CN1, No. V530, Dec. 2002.

"Digital Cellular Telecommunications System (Phase 2+), Universal Mobile Telecommunications System (UMTS), IP Multimedia (IM) Session Handling, IM Call Model, Stage 2 (3GPP TS 23.218, version 5.3.0, release 5), ETSI TS 123 218," ETSI Standards, European Telecommunication Standards Institute, vol. 3-CN1, No. V530, Dec. 2002.

"Security Relationships of Interrogating CSCF (I-CSCF)," 3GPP TSG SA2, Tdoc S3z010034, Apr. 26, 2001.

3GPP TS 24.030 V3.3.0 (Dec. 2001), <arib.or.jp/IMT-2000/V600Dec06/5_Appendix/R99/24/24030-330.pdf>, Dec. 2001.

M. Mealling, RFC 2915, "The Naming Authority Pointer (NAPTR) DNS Resource Record," Sep. 2000, <ietf.org/rfc/rfc2915.txt>.

A. Gulbrandsen, RFC 2782, "A DNS RR for Specifying the Location of Services (DNS SRV)," Feb. 2000, <ietf.org/rfc/rfc2782.txt>.

M. Wasserman, Reccomendation for IPv6 in 3GPP Standards, Jan. 2002, <tools.ietf.org/id/draft-ietf-ipv6-3gpp-recommend-00.txt>.

Lucent, Nokia, "Tdoc NP-040108 Change Request 24.220 CR 605", 3GPP TSG-CN Meeting 23, "Online", Mar. 10, 2004, pp. 1-6, XP002288010.

Digital Cellular telecommunications system (Phase 2+); Universal Mobile Telecommunicaitosn System (UMTS); IP Multimedia Call Control Protocol based on SIP and SDP; Stage 3 (3GPP TS 24.2290 version 5.3.0 Release 5); ETSI TS 124 229, ETSI Standards, European Telecommunication Standards Institute, vol. 3-CN1, No. V530; Dec. 2002.

Digital cellular telecommunications system (Phase 2+); Universal Mobile Telecommunications System (UMTS); IP Multimedia (IM) session handling; IM call model, Stage 2 (3GPP TS 23.218, version 5.3.0, Release 5); ETSI TS 123 218, ETSI Standards, European Telecommunication Standards Institute, vol. 3-CN1, No. V530; Dec. 2002.

"Security Relationships of Interrogating CSCF (I-CSCF)", 3GPP TSG SA2, Tdoc S3z010034, Apr. 26, 2001.

3GPP TS 24.030 V3.3.0 (Dec. 2001), http://www.arib.or.jp/IMT-2000/V600Dec06/5_Appendix/R99/24/24030-330.pdf.

RFC 2915, The Naming Authority Pointer (NAPTR) DNS Resource Record, http://www.ietf.org/rfc/rfc2915.txt., M. Mealling, Sep. 2000.

RFC 2782, A DNS RR for specifying the location of services (DNS SRV), http://www.ietf.org/rfc/rfc2782.txt., A. Gulbrandsen, Feb. 2000.

Recomendation for IPv6 in 3GPP Standards, http://tools.ietf.org/id/draft-ietf-ipv6-3gpp-recommend-00.txt, M. Wasserman, Jan. 2002.

\* cited by examiner

SERVICE PROVISIONING IN A COMMUNICATION SYSTEM

REFERENCE TO RELATED APPLICATIONS

This is a continuation application of U.S. patent application Ser. No. 10/615,420, filed on Jul. 9, 2003, which claims priority of Great Britain Patent Application No. 0306863.2, filed on Mar. 25, 2003. The subject matter of the earlier filed applications are hereby incorporated by reference.

BACKGROUND OF THE INVENTION

1. Field of the Invention

The present invention relates to communication systems, and in particular to initiation of service provisioning, requiring communications between entities associated with the communication system.

2. Description of the Related Art

A communication system can be seen as a facility that enables communication between two or more entities such as user equipment, communication network elements and other entities associated with the communication system. A communication system typically operates in accordance with a given standard or specification which sets out what the various entities associated with the communication system are permitted to do and how that should be achieved. For example, the standard or specification may define whether the user, or more precisely, user equipment or terminal is provided with a circuit switched service and/or a packet switched service. Communication protocols and/or parameters which shall be used for the connection may also be defined. In other words, a specific set of "rules" on which the communication can be based on needs to be defined to enable communication by means of the system.

Communication systems providing wireless communication for the user equipment are known. An example of the wireless systems is a cellular network. In cellular systems, a base transceiver station (BTS) or similar access entity serves mobile stations (MS) or other such wireless user equipment (UE) via a wireless interface between these entities. The communication between the user equipment and the elements of the communication network can be based on an appropriate communication protocol. The operation of the base station apparatus and other apparatus required for the communication can be controlled by one or several control entities. The various control entities may be interconnected. One or more gateway nodes may also be provided for connecting the cellular network to other networks. e.g. to a public switched telephone network (PSTN) and/or other communication networks such as an IP (Internet Protocol) and/or other packet switched networks.

An example of the services that may be offered for the subscribers to a communication system are so called multimedia services. Communication systems enabled to offer the multimedia services are sometimes referenced to as IP Multimedia networks. IP Multimedia (IM) functionalities can be provided by means of a IP Multimedia Core Network (CN) subsystem, or briefly IP Multimedia subsystem (IMS). The IMS comprises various entities for the provision of the multimedia services.

The communication systems have developed in the direction wherein various service provision functions of the network are handled by network entities known as servers. For example, in the current third generation (3G) wireless multimedia network architectures it is assumed that several different servers are used for handling different functions. These include functions such as the call session control functions (CSCFs). The call session functions may be divided into various categories such as a proxy call session control function (P-CSCF), interrogating call session control function (I-CSCF), and serving call session control function (S-CSCF). It shall be appreciated that sometimes the CSCFs may be referred to as call state control functions or call server functions.

The serving call session control function forms the entity the subscriber needs to be registered at in order to be able to request a service from the communication system. The serving call session control function can be divided further between originating call session control function (O-CSCF) and terminating call session control function (T-CSCF) at the originating and terminating ends of a session.

In addition to the serving control entity, the user may need to be associated with proxy control entity, such as the P-CSCF. The proxy entity may be assigned to an area where the user is serviced.

Entities such as a home subscriber server (HSS) and various application servers may also be provided in the communication network. From the above mentioned servers the home subscriber server (HSS) is for storing subscriber related information. The subscriber information may include information such as authentication data (e.g. registration identities of the subscriber or the terminals) and so on. The HSS is typically used for storing permanently subscriber profile information. The home subscriber server (HSS) can be queried by other function entities, e.g. during session set-up procedures.

An application server (AS) is an entity adapted to offer value added IM services for the users. An application server may reside in the user's home network. The application server may also, alternatively, be external to the user's home network, and be provided by a third party service. The third party could be another network or simply a stand-alone application server. An Application Server may influence and impact a data communication session on behalf of the services supported by the operator's network. An application server may host and execute services. Examples of the application servers include Session Initiation Protocol (SIP) Application Servers, Open Service Access (OSA) Application Servers, and Customized Applications for Mobile network Enhanced Logic IP Multimedia Service Switching Functions (CAMEL IM-SSF).

Traditionally communication systems are arranged such that a user, typically a subscriber, has to initiate communications over the communication system. For example, a user may request a session, transaction or other type of communications from an appropriate communications network entity. Such communications can be seen as originating from the user.

Thus, originating sessions/transactions are understood as sessions/transactions that are normally originated by the user equipment of the user or by a network entity on behalf of the user. Terminating sessions/transactions are sessions/transactions that are normally terminated by the user equipment of the user or by a network entity on behalf of the user.

For example, Standards for the 3GPP (Third Generation Partnership Project) release 5 (Rel-5) IMS networks define rules for how the user equipment (ULE) can originate sessions and single transactions. However, the only rules given in the Rel-5 concentrate on how the so-called originating filtering criteria is applied. Release 5 does not enable any other party to originate the session or transaction on the behalf of the user. Release 6 of the 3GPP standards require that the application server (AS) must be able to send session initiation protocol (SIP) requests on behalf of the user equipment via an ISC (IP Multimedia Service Control) interface to the S-CSCF. However, even the current release 6 of the 3GPP standards does not provide any mechanism for the application server (AS) that would enable the application server to do so, other than in exceptional cases where the application server originated requests are directly triggered by requests originated from a user equipment. Therefore the application server is still not able to run services which generate SIP requests or other request on behalf of the user.

The inventors have found that it may be advantageous if network entities such as the application servers could initiate processes requiring communications on behalf of the user such that the user could be seen-as being the originating party. An example of services where this could be useful include messaging lists wherein the application server could sent messages to the members of the list on the behalf of the user. Another example is an application server that could send on the behalf of the user messages communicating the presence status of the user. A still further example is an application that could start sessions or transactions on behalf of the user for example for conference or group calls or for chat applications. It shall be appreciated that the above lists only few examples, and that there are various other services that might benefit from the possibility of a network entity being enabled to originate requests for communications.

However, due to the lack of a mechanism for handling the network entity originated requests such operation might cause problems in the present communication systems. Problems may arise, e.g., with regards to routing of subsequent communications, charging functions and so on. This occurs since the other entities of the communication system may not know, e.g., where to communicate any further messages or how to control the communications.

For example, when a S-CSCF receives a message it needs to be able to make a decision how to treat the message. In the current systems the S-CSCF may apply filter criteria known as 'originating filter' and 'terminating filter' to the message.

The term 'filter criteria' (FC) refers to information that defines the relevant Service Point Triggers (SPTs) for a particular service application. In the SIP communication environment the filter criteria define the subset of SIP requests received by the S-CSCF that should be sent or proxied to a particular service application. The S-CSCF may receive the filter criteria from the home subscriber server (HSS) or the application server (AS).

In the prior art, terminating filter criteria are applied to all messages from the application server. However, the message may be an application server originated service request or other such message that is originated on the behalf of the user in the network. Thus the inventors have found that a mechanism is required for deciding if originating filter criteria shall be applied to the message instead of the terminating filter criteria. This is because the originating filter criteria may give more accurate evaluation results for such messages.

If the wrong "role," i.e. filter criteria, is used for the message, this may cause problems, e.g., in the view of routing and other control operations. Once a decision is made in this regard, the decided role may also need to be communicated to other entities of the communication system so that they may apply a proper filter criteria for evaluation of messages that originate from an entity that is other than a user on the behalf of whom the message is sent.

SUMMARY OF THE INVENTION

Embodiments of the present invention aim to address one or several of the above problems.

According to one aspect of the present invention, there is provided a service provisioning method in a communication system. The method includes the steps of receiving at a first entity associated with the communication system from a storage entity information regarding a communication control entity capable of servicing a user of the communication system; and based on the information, signalling an originating request from the first entity to the communication control entity.

According to one aspect of the present invention, there is provided a communication system arranged for provisioning of services for user of the communication system. The system includes a communication control entity capable of servicing a user of the communication system and a first entity provided with a first interface for receiving information from a storage entity regarding the user and a second interface for signalling an originating request to the communication control entity based on the information from the storage entity.

According to another aspect of the present invention there is provided an application server for a communication system. The application server includes a first interface for receiving information from a storage entity regarding a user of the communication system and a second interface for signalling an originating request to a communication control entity capable of servicing the user based on the information from the storage entity.

According to still another aspect of the present invention there is provided an originating request to be signalled on an interface between a first entity of a communication system and a communication control entity capable of servicing a user of the communication system, the originating request being generated based on information from a user information storage entity.

In a more specific embodiment, the originating request includes information regarding the handling of communications associated with the request. The originating request may include an indication that further communications associated with the originating request shall be handled in a similar manner as if the request had originated from the user. Either terminating services or originating services may be provided based on the request.

The decision how the communication control entity shall handle further communications associated with the request may be made at the first entity.

The first entity may generate an originating request on the behalf of the user.

The originating request may be generated based on information regarding the address of the communication control entity. The first entity may modify information regarding the address of the communication control entity before sending the originating request. The first entity may add a service type indicator into the originating request. The service type indicator may be included in the address of the communication control entity.

The first entity may select a port where the request shall be sent.

An enquiry may be sent to a database from the first entity before sending of the originating request. Such an enquiry is based on the information regarding the communication control entity.

An enquiry may be sent to the storage entity from the first entity for the information regarding the communication control entity capable of servicing the user.

Information regarding at least two different addresses for the communication control entity information may be stored in the storage entity.

The originating request may be indicative of the filter criteria to be applied to the request.

The embodiments of the invention may enable entities of a communication network with a possibility of running a service which acts on behalf of a user. The solution is substantially easy to implement in the existing communication systems. In the instances wherein user information is stored in a centralized manner, such as in a Home Subscriber Server (HSS), this centralized storage may not need to be modified. In certain embodiments the user information storage can be queried using normal communication protocols and procedures, such as a query for finding the correct entry point for a service.

BRIEF DESCRIPTION OF THE DRAWINGS

For better understanding of the present invention, reference will now be made by way of example to the accompanying drawings in which.

DETAILED DESCRIPTION OF THE PREFERRED EMBODIMENT(S)

Figure 1:
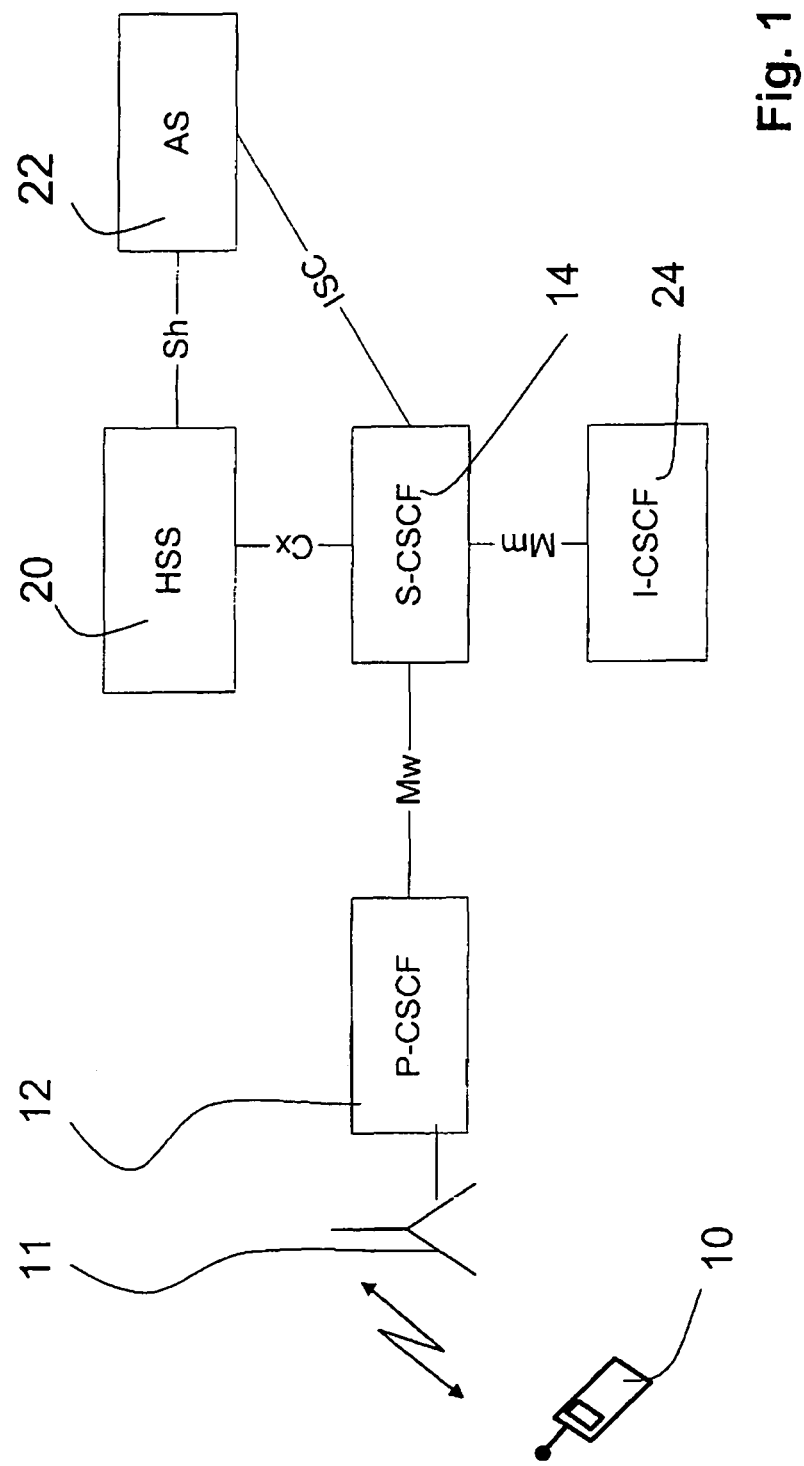
FIG. 1 shows a communication system wherein the invention may be embodied.

Reference is made to FIG. 1 which shows an IP Multimedia Network in which the present invention may be embodied. IP multimedia services may be offered for IP Multimedia Network subscribers. IP Multimedia (IM) functionalities can be provided by means of a Core Network (CN) subsystem comprising various entities for the provision of the service.

In the present invention, an entity of the communication system send an originating request associated with a service to be provided for the user by means of a communication control entity. In the detailed examples below the entity comprises an application server and the communication control entity is provided by a serving call session control function. Before explaining the embodiments in more detail, a brief explanation of these elements and other possible elements associated with the embodiments is given below with reference to FIG. 1. It shall be appreciated that FIG. 1 is a example only of a part of a mobile communication system.

In the shown arrangement a base station 11 provides an access entity of a cellular communications network. The radio access network 11 is controlled by an appropriate controller (not shown for clarity). A controller may be provided for each base station or a controller can control a plurality of base stations. Solutions wherein controllers are provided both in individual base stations and in the radio access network level for controlling a plurality of base stations are also known. It shall thus be appreciated that the name, location and number of the access network controllers depends on the system. For example, a UMTS terrestrial radio access network (UTRAN) may employ a controller node that is referred to as a radio network controller (RNC). In the GSM and CDMA2000 a corresponding radio network controller entity is referred to as a base station controller (BSC).

It shall be appreciated that the FIG. 1 presentation is highly schematic and that in practical implementations the number of base stations would be substantially higher. One access network may include more than one base station. A base station apparatus or site may also provide more than one access network. These features depend on the implementation and circumstances.

The base station 11 is arranged to transmit signals to and receive signals from a mobile user equipment 10 of a mobile user i.e. subscriber via a wireless interface. Correspondingly, the mobile user equipment 10 is able to transmit signals to and receive signals from the base station via the wireless interface. The mobile user may use any appropriate mobile device adapted for Internet Protocol (IP) communication to connect the network. For example, the mobile user may access the cellular network by means of a Personal computer (PC), Personal Data Assistant (PDA), mobile station (MS) and so on. The following examples are described in the context of mobile stations.

The skilled person is familiar with the features and operation of a typical mobile station. Thus, these do not need any detailed explanation. It is sufficient to note that the user may use the mobile station 10 for tasks such as for making and receiving phone calls, for receiving and sending data from and to the network and for experiencing e.g., multimedia content. The mobile station may comprise an antenna element for wirelessly receiving and transmitting signals from and to base stations of the mobile communication network. The mobile station 10 may also be provided with a display for displaying images and other graphical information for the user of the mobile user equipment. Speaker means are also typically provided. The operation of the mobile user equipment may be controlled by means of an appropriate user interface such as control buttons, voice commands and so on. Furthermore, a mobile user equipment is provided with a processor entity and a memory means. It shall be appreciated that although only one mobile station is shown in FIG. 1 for clarity, a number of mobile stations may be in simultaneous communication with each base station of the mobile communication system.

The core network (CN) entities typically comprises various switching and other control entities and gateways for enabling the communication via a number of radio access networks and also for interfacing the one communication system with other communication system such as with other cellular systems and/or fixed line communication systems.

In the current third generation (3G) wireless IP multimedia network architectures it is assumed that several different server entities are used for handling different functions. These include entities that handle call session control functions (CSCFs). The call session functions may be divided into various categories such as a proxy call session control function (P-CSCF) 12, interrogating call session control function (I-CSCF) 24, and serving call session control function (S-CSCF) 14.

The serving call session control function 14 forms an entity whereto the subscriber 10 is registered at. The registration is required in order to be able to request for a service from the communication system. A user may register himself via an access entity of the communication system, such as the base station 11. The serving call session control function 14 can be seen as offering originating call session control functions (O-CSCF) and terminating call session control functions (T-CSCF) at the originating and terminating ends of a session or transaction.

A user may be registered in more than one call session control function at the same time. In addition to the serving control entity 14, the user may need to be associated with proxy control entity, such as the P-CSCF 12 of FIG. 1. The proxy entity 12 may be assigned to an area within which the user has roamed. Thus, when a user accesses the network through an arbitrary type of access network the access network may assign a proxy control entity for controlling the accessed services from that network point of view, e.g. for bandwidth management. It is also possible that the user may search and find an appropriate P-CSCF with his user equipment without help from the access network.

A home subscriber server (HSS) 20 is also shown. As explained above, the home subscriber server (HSS) 20 is for storing subscriber i.e. user related information. The home subscriber server (HSS) can be queried by other function entities over the appropriate interfaces, e.g. during session set-up procedures.

An application server 22 interfacing with the home subscriber server (HSS) 20 and the serving call session control function (S-CSCF) 14 is also shown. In general, an application server can be seen as an entity that hosts service(s) that is/are available in sessions/transactions in accordance with the subscription of the user. Routing to the application server can be done as a result of evaluation of a filter criterion that associates with the subscription of the user.

As described above, two sets of filter criteria may be used. One of the filter criteria sets can be used for the terminating sessions/transactions and another for the originating sessions/transactions. In a typical operation the filtering is applied only to the first message i.e. to the initial request. The remaining messages can be handled without filtering because route can be recorded during the routing of the initial request. Thus the filter criteria have an impact on the further requests because they are routed via the recorded route. Therefore it is possible not to evaluate the filter criteria for the subsequent messages i.e. for the messages in the same dialog after the initial request. However, filtering may also be applied to the subsequent messages.

When the application server 22 originates a session or a transaction by sending a message to the S-CSCF 14, the S-CSCF 14 needs to make a decision in which role to act. If the S-CSCF 14 chooses to act in the originating role the S-CSCF applies the originating filter criteria on the incoming message. In the terminating role the S-CSCF would evaluate the terminating filter criteria. Various alternative ways to implement the selection will be described below. Depending the role, the S-CSCF may then build the address of the service that it returns to the P-CSCF in response to the registration message. The P-CSCF should then use that address when passing messages to the S-CSCF.

It is preferred that the S-CSCF 14 communicates, during the registration, to HSS 20 the address that has to be used in terminating sessions or transactions.

Figure 2:
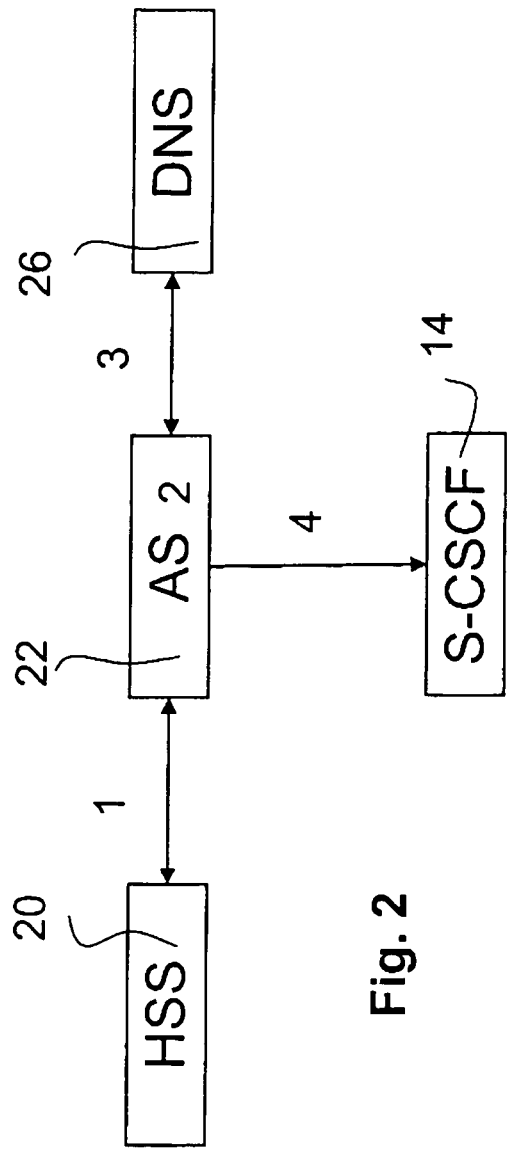
FIG. 2 shows an embodiment of the present invention.

According to a preferred embodiment shown in FIG. 2 the application server 14 receives address information regarding the S-CSCF 14 the user equipment 10 is registered with from the HSS 20. The address information may be provided in response to a query e.g. over the Sh interface between the entities, see step 1 of FIG. 2. The address information may be in the form of any appropriate information, such as the name of the S-CSCF or the URI (Universal Resource Identifier) of the S-CSCF.

In accordance with the preferred form of the present invention the address information is configured so as to include information regarding the desired role. The address information may be configured in accordance with the principles of the present invention in the application server 22 or outside the application server. In the latter case the information may be stored in the configured form in a list, table, database or a like at a source wherefrom the address information is fetched.

Alternatively the address information may be obtained and stored from a request received from the user equipment or an entity of the network.

In FIG. 2 the application server 20 is denoted by step numeral 2 as being responsible for the configuration of the address information. More particularly, the application server 22 may modify the address information such that appropriate service type will be provided for the subscriber. For example, the application server 20 may modify the name of the service so as to build the correct address for the needed service. The S-CSCF name may be modified e.g. by addition of the indicator parameters "term" or "orig" as a prefix to the name received from the HSS. For example, address scscf12.operator.net name may be modified to one of the following depending on whether the session or transaction the application server is starting is an originating or terminating session or transaction:

orig.scscf12.operator.net or
term.scscf12.operator.net

At step 3 the address is resolved with DNS (Domain Name System) 26 in order to get the IP address of the appropriate service.

Depending on the modification the address directs messages to an originating or terminating service. Thus the application server 22 is provided with means by means of which it can route the service request message to either the originating service or the terminating service at step 4. As shown in FIG. 1, this may occur on a ISC (IP Multimedia Service Control) interface.

The application server 22 may alternatively modify the URI of the service by adding a specific parameter to the URI in order to build the correct address for the originating services. The application server 20 may then route the message utilizing the URI together with the parameter as the routing address.

It shall be appreciated that the application server 22 does not necessarily need to modify the name or URI for the terminating services. That is, if no modification is made a terminating service is provided.

It is also possible that the address is modified only in the case of terminating services, and no modification of addresses is made in the case of originating services.

The modification of both the terminating and originating service addresses may, however, be desired in certain application e.g. for symmetry reasons.

The following example will illustrate a possible operation in accordance with the above described principles in more detail. Lets assume that the application server gets the terminating address from the HSS. Let it be, e.g., a Session Initiation Protocol (SIP) address of the form (note that the user part may be omitted):

xx44@scscf7.operator.net

If the application server 22 is going to start a terminating session/transaction it uses the above address as it is to signal to the target S-CSCF 14 that the S-CSCF has to act in the terminating session/transaction role. In a typical operation this would mean that the S-CSCF 14 needs to apply the terminating filter criteria when evaluation incoming messages.

If the application server 22 intends to start an originating session/transaction it modifies the address. This can be done by adding a new 'role' parameter into the address. Thus the modified address including a role parameter role=orig may e.g. have the form:

xx44@scscf7.operator.net;role=orig

The modified address is then signalled to the target S-CSCF as an indication that the target S-CSCF has to act in the originating session/transaction role. In typical operation this would mean that the S-CSCF needs to evaluate the originating filter criteria.

The address of the S-CSCF may be configured in the application server 22 where the address is needed. Alternatively the address may be configured in all application servers. The latter alternative may be advantageous e.g. in instances where there is no Sh interface from the application server 22 to the home subscriber server 20 or where the interface is temporarily unavailable.

According to an alternative, rather that modifying the address itself, the application server 22 may fetch a modified address from a database, file, list, table or alike. The database may be located in the application server 22 or be an external database from the application server.

A possibility for the address built-up is that the parameter is stored in the HSS 20 together with the address of the S-CSCF 14. The application server 22 may then build the correct address utilizing the address and parameter information from the HSS as input for the modification process.

Figure 3:
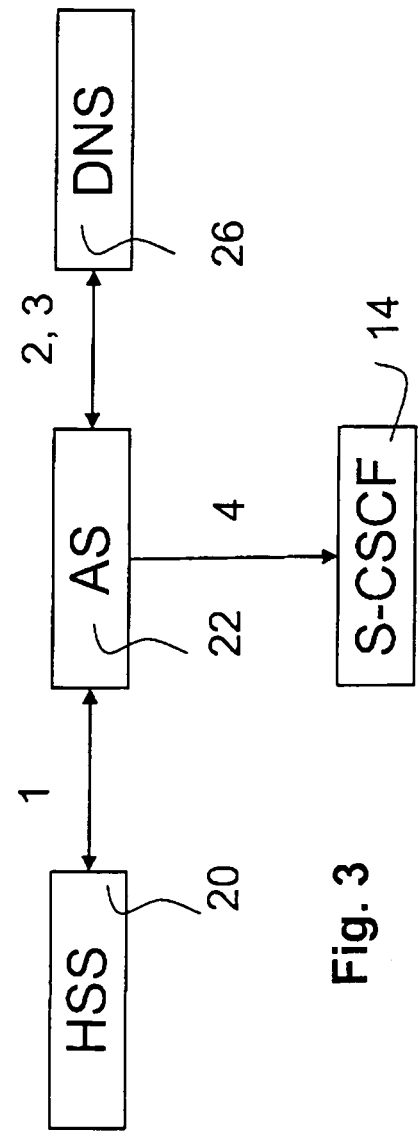
FIGS. 3 and 4 show other embodiments.

According to a possibility shown in FIG. 3 the application server 22 makes a DNS (Domain Name System) query based on the address information returned from the HSS at step 1. The returned S-CSCF name may be used for asking e.g. the SRV resource records to find out the address and port where the needed service (originating or terminating) is available. The SRV is a DNS resource records (RR) for specifying the location of services (DNS SRV). Use of the SRV resource records enables querying for a specific service and/or protocol for a specific domain. The response will then include the name of any available server meeting the criteria.

For example, the following DNS query from the SRV resource records may be done when the originating filter criteria should be evaluated. The SRV resource record typically specifies both the protocol and the service. The SRV records can be queried at step 2 e.g. by using the following address as an argument:

_orig._sip.scscf12.operator.net

The answer at step 2 may be an advice to route to a specified address "orig.scscf12.operator.net" using port 5060:

_orig._sip.scscf12.operator.net SRV 0 0 5060
orig.scscf12.operator.net.

Alternatively, the answer may be routing to a specified port 55334 with the original address "scscf12.operator.net":

_orig._sip.scscf12.operator.net SRV 0 0 55334
scscf12.operator.net.

The following argument may be used in a DNS query (SRV) when the terminating filter criteria should be evaluated:

_term._sip.scscf12.operator.net.

The answer may be an advice to route to a specified address "term.scscf12.operator.net" using port 5060:

_term._sip.scscf12.operator.net SRV 0 0 5060
term.scscf12.operator.net.

Or as above, the answer might be e.g. routing to a specified port 55335 with the original address "scscf12.operator.net":

_term._sip.scscf12.operator.net SRV 0 0 55335
scscf12.operator.net.

It shall be appreciated that the above type of routing may not be necessary for the terminating services, since that is typically how the application server originated requests would be handled unless anything else is indicated. Application wherein no special routing for the originating services is required are also possible. As with the address modification, the above discussed type of routing may be desired e.g. for symmetry reasons.

The application server may then resolve the address with the DNS at step 3 and route at step 4 messages to the indicated address and/or port.

According to another possibility the subscriber database (e.g. the HSS 20) returns in step 1 the name of S-CSCF. The application server makes then a DNS query with the returned S-CSCF name asking for NAPTR (Naming Authority Pointer) resource records to find out the services (originating and/or terminating) which are available. Based on the response the application server may then route the request message to a desired address. This embodiment allows use of the DNS for look-up services for a wide variety of resource names which are not in the domain name syntax. The possible resource names include the URIs for the services.

The following is an example of a NAPTR query with SRV. The DNS query nay be done by asking for NAPTR resource records (RR) using the domain part of the S-CSCF address, e.g.
scscf12.operator.net
The result could then be the following:
IN NAPTR 100 10 "S" "sip+orig" ""
_orig._sip.scscf12.operator.net.
IN NAPTR 100 10 "S" "sip+term" ""
_term._sip.scscf12.operator.net.

Because the order and preference fields are equal, any of the RRs can be chosen. If an address for S-CSCF for originating sessions/transactions is needed, it is possible to choose the first address. Flag "S" tells that the next DNS query will be done asking SRV RR. The DNS query may then be done asking SRV RR with the domain name, i.e. by address as above _orig._sip.scscf12.operator.net.

The result of the DNS query may be an IP address, or any other appropriate routing information.

It is also possible to implement the NAPTR without a SRV query. As above, the DNS query may be done asking NAPTR RR using the domain part of the S-CSCF address e.g.

scscf12.operator.net
The result could be
IN NAPTR 100 10 "A" "sip+orig" ""
orig.scscf12.operator.net.
IN NAPTR 100 10 "A" "sip+term" ""
term.scscf12.operator.net.

Because the order and preference fields are equal, any of the RRs can be chosen. As an address of the S-CSCF for originating sessions/transactions is needed, the first one can be chosen. Flag "A" tells that the next DNS query is done asking SRV A, AAAA or A6 resource records. The DNS query may then be done asking A, AAAA or A6 RR with the domain name orig.scscf12.operator.net. The query would then result an IP address.

According to a further alternative, a DNS query done by asking NAPTR RR using the domain part of the S-CSCF address (e.g. scscf12.operator.net) may result the following:

IN NAPTR 100 10 "U" "sip+orig" "!(^.$)!sip:orig.\1!".
IN NAPTR 100 10 "U" "sip+term" "!(^.$)!sip:term.\1!".

The advantage of this alternative is that all S-CSCF typically have common NAPTR resource records. Because the order and preference fields are equal, any of the RRs can be chosen, and thus the first one for the originating session/transaction can be chosen. Flag "U" tells that the result will be an URI. The result may then be sip:orig.scscf12.operator.net.

Domain part of the URI is resolved to IP address by means of a DNS query. The DNS query may be done asking A, AAAA or A6 RR with the domain name, and the result would be an IP address.

A possibility is that the application server chooses or modifies the correct port where to send the message. The port may be added at the end of the address.

In the above examples the indicated of the service type was included in the domain part of the address. A possibility is that the application server chooses or modifies the user part of the address. For example, the application server may modify the address scscf12.operator.net by adding a tag, character, character string or bit string as a user part, thus building an address for an originating service (or vice versa):

orig@scscf12.operator.net

In the above described embodiments only one address of the S-CSCF is stored in HSS. In the examples the roles are then signaled to the S-CSCF by means of a modified address that may consist of a modified user part, a modified host or domain name, a modified port number, a parameter added to the address, or any combination of these. In the preferred form the operation is such that when the parameter is present or the address is modified, the S-CSCF has to act in the originating role. If no added parameter can be found, or the address is not modified, the S-CSCF acts in the terminating role.

Figure 4:
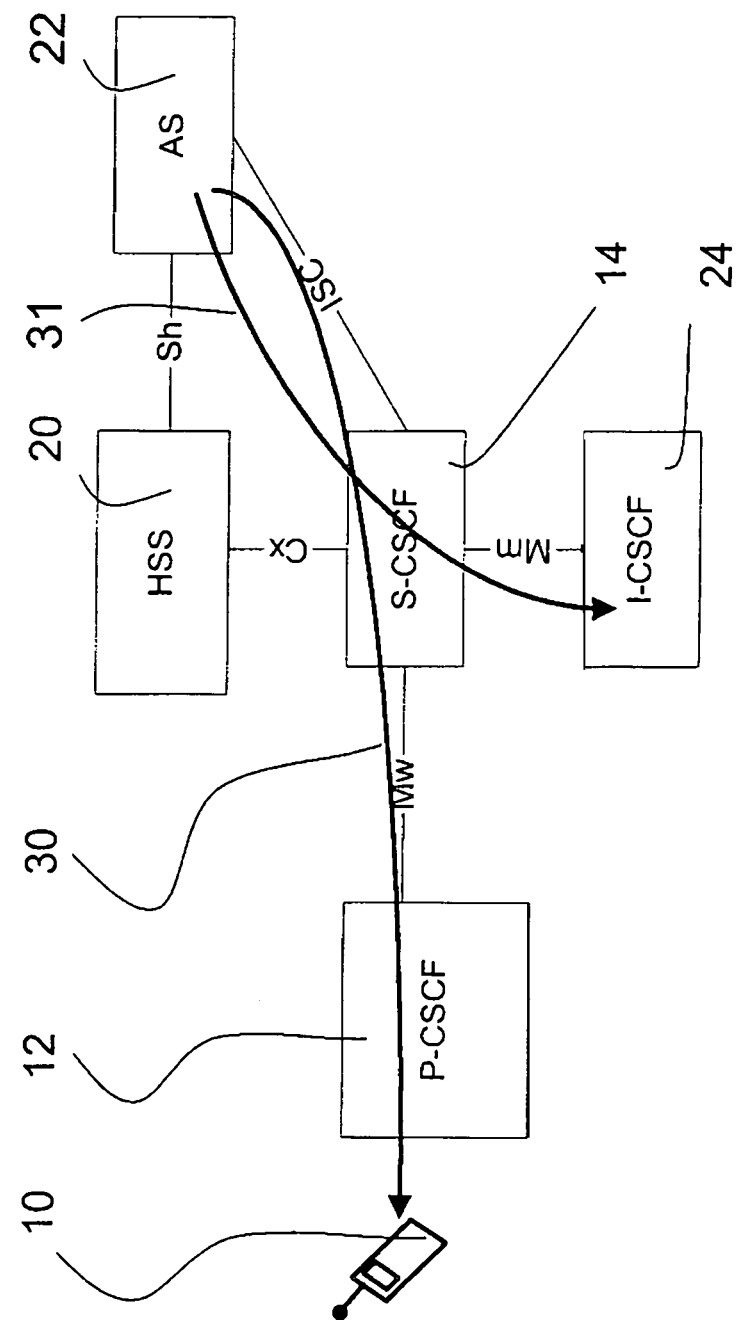

However, it is also possible to store two addresses (i.e. an address for the originating and an address for the terminating role) of a S-CSCF in the HSS. Thus, in accordance with another embodiment shown in FIG. 4 more than one address for the S-CSCF is stored in the home subscriber server (HSS) 20.

More particularly, HSS 20 may store S-CSCF an address for triggering the originating filter criteria and another for triggering the terminating filter criteria. The application server 22 may then fetch the desired address via the Sh interface when it needs to act on behalf of the user equipment 10. Alternatively, the application server 22 may fetch both addresses and select the one it needs. This is an implementation issue.

The two curved routing arrows 30 and 31 show the messaging for the two different service types. The messaging arrow 30 shows the information flow for the terminating services of the user that are executed based on the terminating service profile. The messaging arrow 31 shows the information flow for the originating services of the user that are executed based on the originating service profile.

Figure 5:
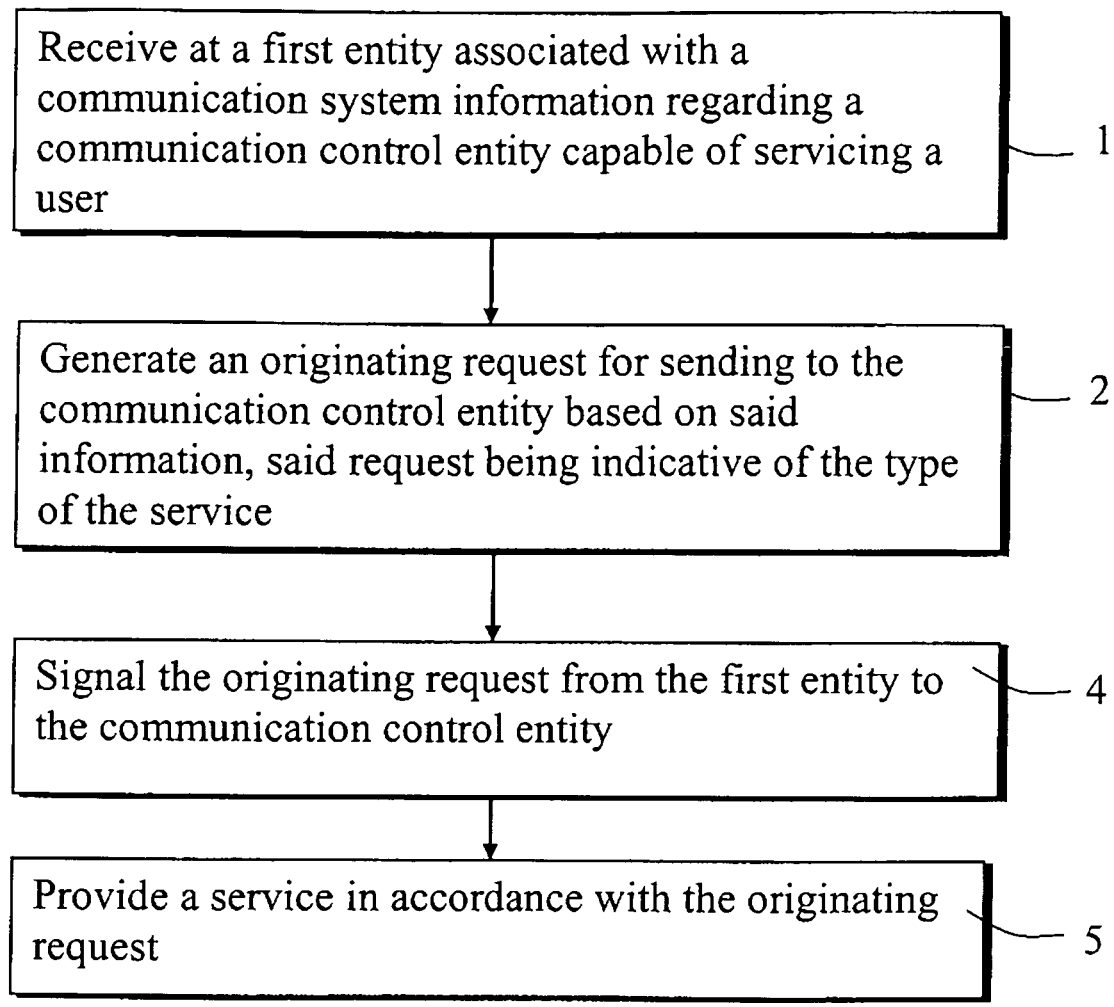
FIG. 5 is a flowchart illustrating service provisioning by means of the embodiments.

FIG. 5 shows a possibility for the provisioning of services by means of the above described embodiments. For steps 1, 2 and 4, see the above description of the embodiments of FIGS. 2 and 3. In step 5 the service is provided as the request for the service would have come from the user.

In the above described exemplifying communication environment an extension to the existing Sh interfaces may be required for pulling originating S-CSCF address from the HSS to the application server. This can be provided by means of an extension to the Sh-pull request for the inclusion of the "S-CSCF name" information element. Similarly, an extension to the Cx interface between the HSS 20 and the S-CSCF 14 may be required for pushing originating S-CSCF address information from the S-CSCF 14 to the HSS 20.

It shall be appreciated that the address or name of the communication control entity stored in the storage entity may or may not contain a user part. The address or name may or may not contain a port. The arrangement may be such that during registration of the user equipment with IP Multimedia services, the S-CSCF may push the address thereof for originating requests to the HSS via the Cx interface. The Cx:S-CSCF registration and/or deregistration notification requests may be extended to contain both the originating S-CSCF and terminating S-CSCF addresses.

In the above examples it was assumed that the user equipment is registered with at least one serving call session control function. It is possible to use default address or the last known address in instances wherein no registration can be found for the user or the address of the S-CSCF cannot be received from HSS.

As briefly mentioned above, it may not be necessary for the application server to fetch the address information from an external database. In addition to the HSS described above, the address information may be obtained from any appropriate external database such as a Subscriber Location Function (SLF) or a Service and Subscription Repository (SSR).

The application server or any other appropriate entity may also originally receive the S-CSCF address information from a request it received from the user equipment. The received address information be stored at a storage entity integrated with the application server. When the address information is later needed for an originating request, the information may then be obtained from the integrated storage entity of the application server.

It shall be appreciated that although the user can indirectly cause originating or terminating service provisioning, the responsibility of handling the address or name of the servicing communication control entity (e.g. the S-CSCF) is on the application server. Thus the user is not directly addressing the servicing communication control entity. Thus the application server may receive information regarding the communication control entity capable of servicing the user equipment from various sources. In addition to the storage entities such as a subscriber database (e.g. the HSS) or an internal database of the application server, the application server may also obtain the name or address of the servicing communication control entity from a message received from the servicing communication control entity or any other network entity. Such as message may be e.g. a previous request terminated by the application server.

It is also possible that the application server gets a list of servicing communication control entity addresses from the HSS or other database. The AS may then choose a correct one from the list. This may be an useful option e.g. when the user is not registered at all and there is no S-CSCF address available in the HSS. The AS may then pick an address from a list of default S-CSCFs. In such situation the HSS may then return only capabilities. Based on this information the AS is able to select a correct S-CSCF. It should be appreciated that whilst embodiments of the present invention have been described in relation to mobile stations, embodiments of the present invention are applicable to any other suitable type of user equipment.

The embodiment of the present invention has been described in the context of a third generation mobile communication system such as the Universal Mobile Telecommunication System (UMTS), i-phone or CDMA2000 and the Terrestrial Trunked Radio (TETRA) system. Furthermore, the given examples are described in the context of the so called all SIP networks with all SIP entities. This invention is also applicable to any other appropriate communication systems, either wireless or fixed line systems and standards and protocols. Examples of other possible communication systems enabling wireless data communication services, without limiting to these, include the General Packet Radio Service (GPRS), the Enhanced Data rate for GSM Evolution (EDGE) mobile data network, and various wireless local area network (W-LAN) applications. Examples of fixed line systems include the diverse broadband techniques providing Internet access for users in different locations, such as at home and offices. Regardless the standards and protocols used for the communication network, the invention can be applied in all communication networks wherein network entities can be made capable of originating sessions or transactions.

The embodiment of the invention has discussed the interface between an application server entity and a servicing call session control function entity. However, it shall be appreciated that the application server is only an example of a server. Embodiments of the present invention can be applicable to other network entities where applicable. Therefore it should also be appreciated that what is said about the application server is valid also for a gateway, any other server, a proxy, a client, a user agent or any other network element, function, functionality or alike that may originate a session or transaction.

It shall be appreciated that the term communications refers to any session or transaction such as to a call, data (e.g. web browsing) or multimedia communication and so on.

There may also be several other roles than the ones described above, either replacing them or in addition to them. Similar mechanism may be used for handling the other roles. If additional roles are used, the additional roles may be, for example, assigned with an address of their own which is then stored at the subscriber database or indicated by a new parameter.

It is also noted herein that while the above describes exemplifying embodiments of the invention, there are several variations, combinations and modifications which may be made to the disclosed solution without departing from the scope of the present invention as defined in the appended claims.

We claim:

1. A method, comprising:
receiving, at a communication control entity configured to service a user of a communication system, an initial request generated on behalf of the user by a first network entity associated with the communication system, the initial request including information regarding handling of communications associated with the initial request, the information comprising an indicating parameter appended to a uniform resource locator to indicate whether to originate a service or terminate the service; and
providing, based on the information included in the initial request, by the communication conrol entity at least one of:
originating services, when the information included in the initial request indicates origination; or
terminating services, when the information included in the initial request indicates termination.

2. A method as claimed in claim 1, wherein the initial request includes an indication that further communications associated with the initial request are handled in a similar manner as if the initial request had originated from the user.

3. A method as claimed in claim 1, wherein the initial request comprises a service type indicator.

4. A method as claimed in claim 3, wherein the initial request comprises an address for the communication control entity and the service type indicator is included in the address.

5. A method as claimed in claim 1, wherein the initial request is indicative of a filter criteria to be applied to the initial request.

6. A method as claimed in claim 1, wherein the first network entity comprises an application server and the communication control entity comprises a serving call session control function.

7. An apparatus, comprising:
receiver circuitry configured to receive, at a communication control entity configured to service a user of a communication system, an initial request generated on behalf of the user by a first network entity associated with the communication system, the initial request including information regarding handling of communications associated with the initial request, the information comprising an indicating parameter appended to a uniform resource locator to indicate whether to originate a service or terminate the service; and
processor circuitry configured to provide, based on the information included in the initial request, at least one of:
originating services by the communication control entity, when the information included in the initial request indicates origination, or
terminating services by the communication control entity, when the information included in the initial request indicates termination.

8. An apparatus as claimed in claim 7, wherein the processor is configured to handle further communications associated with the initial request in a similar manner as if the request had originated from the user based on an indication in the initial request that further communications associated with the initial request are handled in a similar manner as if the initial request had originated from the user.

9. An apparatus as claimed in claim 7, wherein the processor is configured to apply a filter criteria based on an indicator in the initial request.

10. An apparatus as claimed in claim 7, wherein the communication control entity comprises a serving call session control function.

11. A computer program embodied on a non-transitory computer-readable storage medium and configured to control a processor to perform a process, the process comprising:
receiving, at a communication control entity configured to service a user of a communication system, an initial request generated on behalf of the user by a first network entity associated with the communication system, the initial request including information regarding handling of communications associated with the initial request, the information comprising an indicating parameter appended to a uniform resource locator to indicate whether to originate a service or terminate the service; and
providing based on the information included in the initial request, by the communication control entity at least one of:
originating services, when the information included in the initial request indicates origination; or
terminating services, when the information included in the initial request indicates termination.

12. A computer program as claimed in claim 11, wherein the initial request includes an indication that further communications associated with the initial request are handled in a similar manner as if the initial request had originated from the user.

13. A computer program as claimed in claim 11, wherein the initial request comprises a service type indicator.

14. A computer program as claimed in claim 13, wherein the initial request comprises an address for the communication control entity and the service type indicator is included in the address.

15. A computer program as claimed in claim 11, wherein the initial request is indicative of a filter criteria to be applied to the request.

* * * * *